(12) United States Patent
Chang

(10) Patent No.: US 8,860,655 B2
(45) Date of Patent: Oct. 14, 2014

(54) EDGE-LIT BACKLIGHT MODULE AND SCANNING METHOD THEREOF

(75) Inventor: Kuangyao Chang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 57 days.

(21) Appl. No.: 13/583,226

(22) PCT Filed: Jul. 12, 2012

(86) PCT No.: PCT/CN2012/078525
§ 371 (c)(1),
(2), (4) Date: Sep. 7, 2012

(87) PCT Pub. No.: WO2014/000323
PCT Pub. Date: Jan. 3, 2014

(65) Prior Publication Data
US 2014/0002513 A1  Jan. 2, 2014

(30) Foreign Application Priority Data
Jun. 28, 2012  (CN) ............................ 2012 1 0218689

(51) Int. Cl.
*G02B 27/22* (2006.01)
*G09G 3/36* (2006.01)
(52) U.S. Cl.
CPC . *G09G 3/36* (2013.01); *G02B 27/22* (2013.01)
USPC .............................. 345/102; 362/602; 345/691
(58) Field of Classification Search
CPC .. G09G 3/36; G09G 2310/0237; H04N 13/04
See application file for complete search history.

(56) References Cited

U.S. PATENT DOCUMENTS

| | | | | |
|---|---|---|---|---|
| 2008/0297671 A1* | 12/2008 | Cha et al. | ......................... | 349/15 |
| 2010/0289883 A1* | 11/2010 | Goris et al. | ..................... | 348/56 |
| 2013/0194520 A1* | 8/2013 | Li et al. | ........................... | 349/15 |

OTHER PUBLICATIONS

U.S. Appl. No. 13/583,227, filed Sep. 7, 2012, Asymmetric Prism Structure, Light Guide Plate, Backlight Module, and Application.
U.S. Appl. No. 13/635,404, filed Sep. 15, 2012, Side-Edge Non-Uniform Duty Ratio Backlight Driving Method.
U.S. Appl. No. 13/699,630, filed Nov. 11, 2012, Light Guide Plate and Manufacturing Method Thereof.
U.S. Appl. No. 13/698,039, filed Nov. 14, 2012, Side-Edge Backlight Module Having Non-Uniformly Sized Backlight Sections and Design Method Thereof.

* cited by examiner

*Primary Examiner* — Waseem Moorad
*Assistant Examiner* — Sujit Shah
(74) *Attorney, Agent, or Firm* — Andrew C. Cheng

(57) ABSTRACT

The present invention provides an edge-lit backlight module containing 2n+1 sequentially and equally separated backlight partitions where the 2n+1 backlight partitions are lit or turned off individually under a time-sequence control; a LCD panel scanned by the edge-lit backlight module is correspondingly separated into 2n+1 display partitions; the signal to the LCD panel is loaded into the LCD panel frame by frame and display partition by display partition under a time-sequence control; the time sequences to the signal to the LCD panel and the signal to the backlight partitions are controlled so that, whenever the signal loaded into the 2n+1 display partitions of the LCD panel constitutes a complete frame, the n+1 backlight partition in the middle of the edge-lit backlight module is always lit. The present invention also provides a scanning method of an edge-lit backlight module.

9 Claims, 3 Drawing Sheets

EDGE-LIT BACKLIGHT MODULE AND SCANNING METHOD THEREOF

BACKGROUND OF THE INVENTION

1. Field of the Invention

The present invention relates to the field of liquid crystal displaying techniques, and in particular to an edge-lit backlight module and a scanning method of the edge-lit backlight module.

2. The Related Arts

The so-called shutter glasses 3D display technique is the most popular solution by recent 3D LCD TVs. This technique displays images respectively for the left and right eyes by partitioning backlight blinking. Then, with synchronously blinking glasses, the left and right eyes perceive different images, thereby achieving stereoscopic visual effect. More specifically, this technique involves delivering the frame signals for the left and right eyes alternately to the LCD panel, driving the LCD panel to display the images for the left and right eyes, and, together with the scanning of the backlight module and the time-synchronized shutter glasses, making the viewer to perceive the images for the left and right eyes as a single 3D image.

The 3D LCD display has a disadvantage. Since the LCD panel requires a backlight module to provide illumination, the partitioning of the backlight cannot be too fine. FIG. 1 is a schematic diagram showing the partitioned illumination and leakage of an edge-lit LED backlight. The edge-lit LED backlight is to arrange LED dies along the circumference of a LCD panel. Then the light emitted from the edge of the LCD panel is delivered to the center of the LCD panel through a light guide plate so as to provide the required illumination to present the image on the LCD panel. The edge-lit LED backlight has two advantages. One is that fewer LED dies are required and as such cost is reduced. The other one is that the thickness of the LCD panel can be reduced as the LED module is at the side, not in the back.

As illustrated in FIG. 1, a backlight partition 11 is lit from the right side of the LCD panel. When the backlight partition 11 is lit, the light leaks into zones 12 and 13, and, as the light travels farther, the leakage is more serious. The leakage would cause interference between the signals for the left and right eyes. In other words, the left eye would perceive the signal for the right eye or vice versa. The interference results in a blurred image as the two signals are distributed spatially apart. The degree of blur is measured by cross-talk. A greater cross-talk means a greater interference between the left- and right-eye signals. Therefore, a major R&D topic is to reduce cross-talk so as to maintain product competitiveness.

The problem of cross-talk between the left- and right-eye signals is inherent in the shutter glasses 3D display technique. According to the shutter glasses 3D display technique, the backlight module is separated vertically into an even number of backlight partitions. The time and duration of illuminating each backlight partition is controlled in accordance with the top-down image scanning. The image signal (for left or right eye) provides the driving voltage sequentially from top to bottom to the rows of pixels of the LCD panel. Under the charge of the driving voltage, the pixels of the LCD panel start to respond. Due to the design of the pixel and the viscosity of liquid crystal, a period of response time is required before the liquid crystal reach a steady state. Due to the required response time of the liquid crystal, images are scanned onto the LCD panel also by partitions. When the image signal for a partition of the LCD panel is scanned, a corresponding backlight partition is lit while the other backlight partitions are turned off. Due to the leakage described above, when the light of a backlight partition for a left-eye signal leaks to an adjacent backlight partition for a right-eye signal (or vice versa), the eye would perceive both left- and right-eye images (i.e., the cross-talk). The left- or right-eye signal causing the cross-talk is referred as error signal (or cross-talk signal).

FIGS. 2A and 2B are schematic diagrams showing the illumination of the backlight partitions of an existing 46-inch single-shorter-edge-lit LED TV. The backlight module 20 is usually separated into an even-numbered (e.g., 4) backlight partitions. When a topmost backlight partition 21 is lit, the backlight leaks to a lower backlight partition. When a middle backlight partition 22 is lit, the backlight leaks to both an upper backlight partition and a lower backlight partition.

FIG. 3 is a schematic diagram showing the measurement of cross-talk at 9 points on a LCD panel. As illustrated, the horizontal and vertical dimensions of the LCD panel 30 are denoted as H and V, respectively. Using an existing 46-inch single-shorter-edge-lit LED TV as example, the 9 points' cross-talk is measured and summarized in Table 1. As can be seen from Table 1, the cross-talk is not vertically symmetric with a greater value at upper points and a smaller value at lower points. The cross-talk is also not horizontally symmetric. This is due to light is incident from a side and, as it travels farther, the leakage is more serious.

TABLE 1

| Cross-talk at 9 points (46-inch, single-shorter-edge-lit, and 4 backlight partitions). | | | |
| --- | --- | --- | --- |
| Single-edge-lit | Left 1/9 | Middle 1/2 | Right 8/9 |
| Upper 1/9 | 14.99% | 8.84% | 7.03% |
| Middle 1/2 | 5.60% | 4.51% | 3.69% |
| Lower 8/9 | 8.47% | 6.20% | 4.81% |

From the data of Table 1, for an existing 46-inch, single-shorter-edge-lit LED TV, the left- or right-eye signal has the best image quality at the center of the LCD panel and the image quality is vertically asymmetric. The vertically asymmetric cross-talk shown in Table 1 can be explained by the time sequence relationship between signals to the backlight partitions and the LCD panel. FIG. 4 is a schematic diagram showing the time-sequence relationship between signal to the backlight partitions and signal to the LCD panel (i.e., the left- or right-eye image signal to the LCD panel) of an existing 46-inch, single-shorter-edge-lit LED TV (left-eye signal). The backlight module is vertically and sequentially separated into a first backlight partition 41, a second backlight partition 42, a third backlight partition 43, and a fourth backlight partition 44, for illuminating a first display partition, a second display partition, a third display partition, and a fourth display partition of a LCD panel 40, respectively. Using the left-eye signal as example, FIG. 4 shows the consecutive steps of the LCD panel 40 and the backlight partitions illuminating the LCD panel 40. In step a, the left-eye signal from a current frame is loaded into the first to third display partitions whereas the right-eye signal from a previous frame is loaded into the fourth display partition. The first backlight partition 41 is lit to illuminate the first display partition. Since the light from the first backlight partition 41 may leak to the fourth display partition, the right-eye signal from a previous frame loaded into the fourth display partition becomes the error signal causing cross-talk with the left-eye signal from a current frame loaded into the first display partition. As the first and fourth display partitions are separated by two display partitions in between, the cross-talk is mild. In step b, the left-eye signal from a current frame is loaded into the fourth display partition and, therefore, the complete left-eye signal for the current frame is loaded into the LCD panel 40. The second backlight partition 42 is lit to illuminate the second display partition and the leakage from the second backlight partition 42 does not cause any cross-talk. As such, the image quality is the best. In step c, the right-eye signal from a next frame is loaded into the first display partition whereas the left-eye signal from a current frame is loaded into the second to fourth display partitions. The third backlight partition 43 is lit to illuminate the third display partition. The right-eye signal from a next frame loaded into the first display partition becomes the error signal causing cross-talk with the left-eye signal from a current frame loaded into the third display partition. Since the first and third display partitions are separated by a display partition in between, the cross-talk is more serious as their distance is closer. In step d, the right-eye signal from a next frame is loaded into the first and second display partitions whereas the left-eye signal from the current frame is loaded into the third and fourth display partitions. The fourth backlight partition 44 is lit to illuminate the fourth display partition. The right-eye signal from a next frame loaded into the first and second display partitions becomes the error signal causing cross-talk with the left-eye signal from the current frame loaded into the fourth display partition. Since the first and second display partitions are separated from the fourth display partition by a display partition in between, the cross-talk is more serious as their distance is closer. In the entire 3D display process, the LCD panel 40 is loaded repeatedly with the right-eye signal (previous frame), the left-eye signal (the current frame), the right-eye signal (the next frame), the left-eye signal, the right-eye signal, etc. Since the existing edge-lit backlight modules are divided into an even-numbered backlight partitions. The error signal has different impact to those display partitions above and below. In the above example, the error signal where the lit time of the backlight partition closer to the top produces greater cross-talk in the top portion of the LCD panel 40. The cross-talk of the LCD panel 40 is therefore vertically asymmetric. If the signal to the LCD panel 40 is adjusted so that the backlight partition is lit in the middle of the signal to the LCD panel, the cross-talk would become more vertically symmetric. Yet, as the number of backlight partitions is even, the image quality in the center of the LCD panel would be affected and the cross-talk is more serious.

SUMMARY OF THE INVENTION

Therefore, an objective of the present invention is to resolve the he disadvantages of existing backlight modules with even-numbered backlight partitions: (1) cross-talk is vertically asymmetric across the panel; and (2) cross-talk in the middle would increase when trying to make the cross-talk vertically symmetric.

To achieve the objective, the present invention provides an edge-lit backlight module containing 2n+1 sequentially and equally separated backlight partitions where n is a natural number greater than or equal to 1; the 2n+1 backlight partitions are lit or turned off individually under a time-sequence control; a LCD panel scanned by the edge-lit backlight module is separated correspondingly into 2n+1 display partitions; the signal to the LCD panel is loaded into the LCD panel frame by frame and display partition by display partition under a time-sequence control; and the time sequences to the signal to the LCD panel and the signal to the backlight partitions are controlled so that, whenever the signal loaded into the 2n+1 display partitions of the LCD panel constitutes a complete frame, the n+1 backlight partition in the middle of the edge-lit backlight module is always lit.

According to the present invention, the edge-lit backlight module is a single-shorter-edge-lit backlight module.

According to the present invention, the edge-lit backlight module is a dual-shorter-edge-lit backlight module.

According to the present invention, n is equal to 1.

The present invention further provides an edge-lit backlight module containing 2n+1 sequentially and equally separated backlight partitions where n is a natural number greater than or equal to 1; the 2n+1 backlight partitions are lit or turned off individually under a time-sequence control; a LCD panel scanned by the edge-lit backlight module is correspondingly separated into 2n+1 display partitions; the signal to the LCD panel is loaded into the LCD panel frame by frame and display partition by display partition under a time-sequence control; the time sequences to the signal to the LCD panel and the signal to the backlight partitions are controlled so that, whenever the signal loaded into the 2n+1 display partitions of the LCD panel constitutes a complete frame, the n+1 backlight partition in the middle of the edge-lit backlight module is always lit; the edge-lit backlight module is a single-shorter-edge-lit backlight module; and n is equal to 1.

The present invention further provides a scanning method of an edge-lit backlight module which contains the following steps.

In step 1, the edge-lit backlight module is separated sequentially and equally into 2n+1 backlight partitions where n is a natural number greater than or equal to 1.

In step 2, a LCD panel is separated correspondingly into 2n+1 display partitions where the signal to the LCD panel is loaded into the LCD panel frame by frame and display partition by display partition under a time sequence.

In step 3, the time sequences to the signal to the LCD panel and the signal to the backlight partitions are controlled so that, whenever the signal loaded into the 2n+1 display partitions of the LCD panel constitutes a complete frame, the n+1 backlight partition in the middle of the edge-lit backlight module is always lit.

According to the scanning method, the edge-lit backlight module is a single-shorter-edge-lit backlight module.

According to the scanning method, the edge-lit backlight module is a dual-shorter-edge-lit backlight module According to the scanning method, n is equal to 1.

The edge-lit backlight module of the present invention is capable of achieving vertically symmetric cross-talk while maintaining a minimum cross-talk in the middle of the LCD panel, thereby enhancing the 3D display quality comprehensively. The scanning method of the present invention is capable of achieving vertically symmetric cross-talk while maintaining a minimum cross-talk in the middle of the LCD panel, thereby enhancing the 3D display quality comprehensively.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
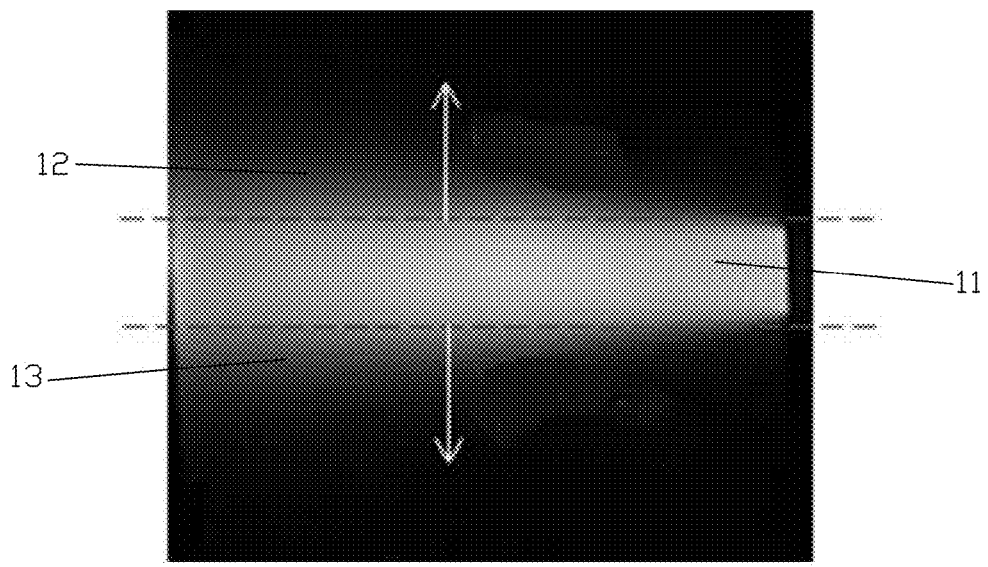
FIG. 1 is a schematic diagram showing the partitioned illumination and leakage of an edge-lit LED backlight.
Figure 2A:
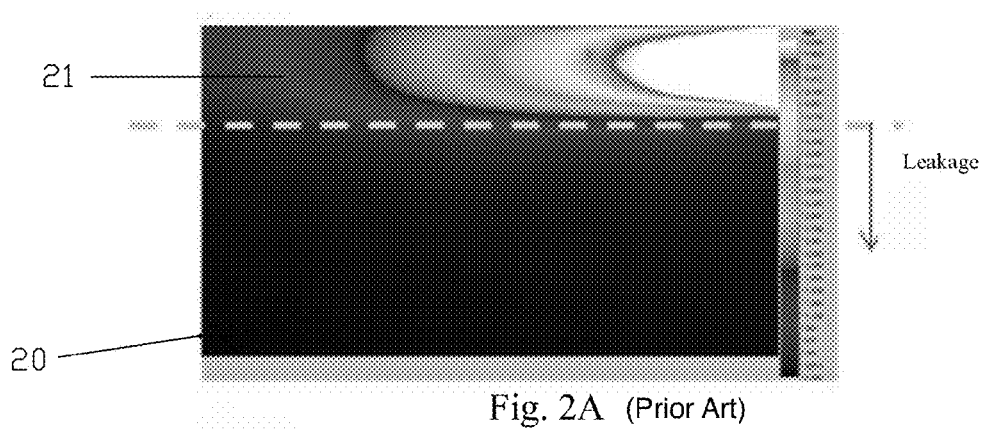
FIGS. 2A and 2B are schematic diagrams showing the illumination of the backlight partitions of an existing 46-inch single-shorter-edge-lit LED TV.
Figure 2B:
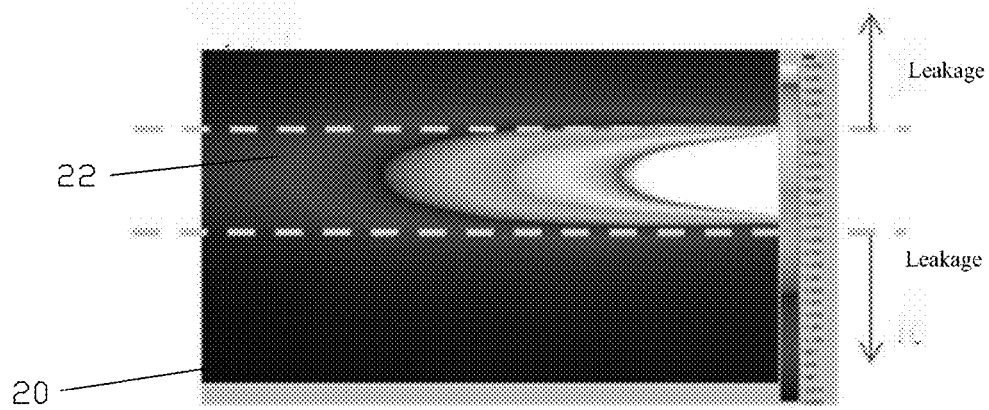
Figure 3:
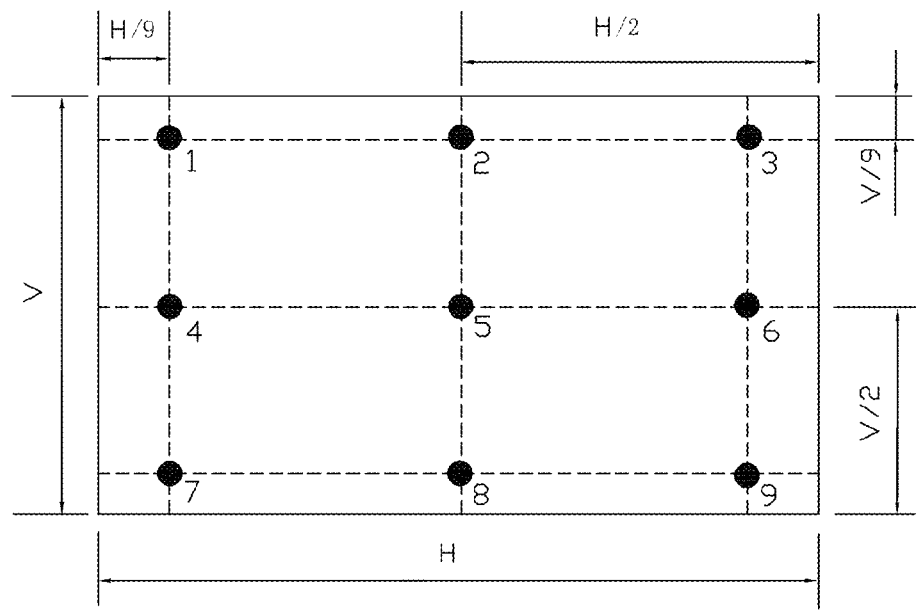
FIG. 3 is a schematic diagram showing the measurement of cross-talk among 9 points on a LCD panel.
Figure 4:
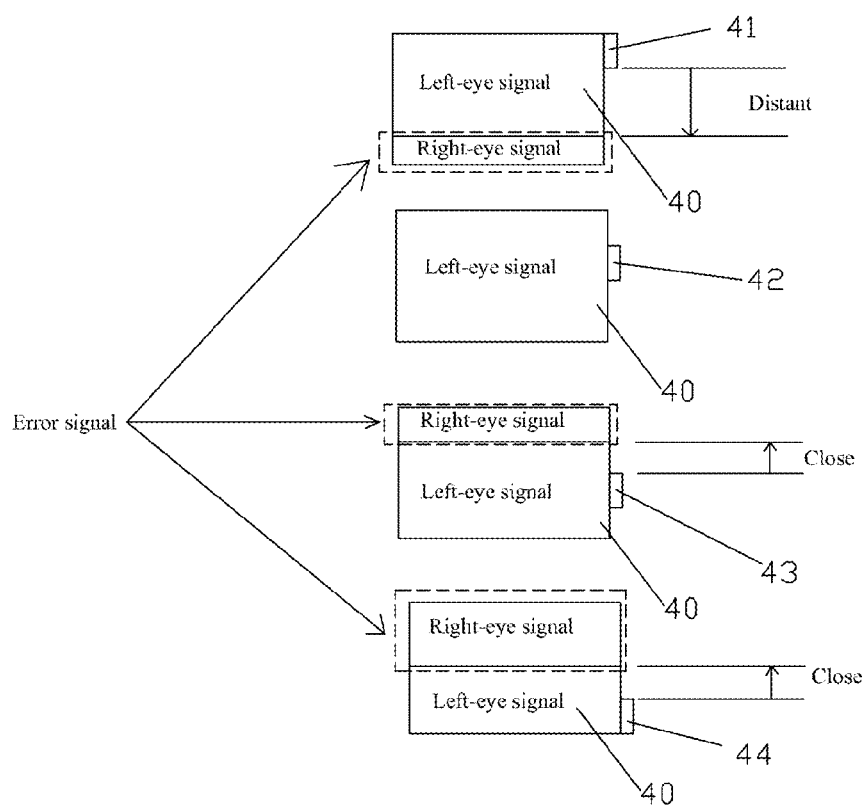
FIG. 4 is a schematic diagram showing the time-sequence relationship between signal to the backlight partitions and signal to the LCD panel (i.e., the left- or right-eye image signal to the LCD panel) of an existing 46-inch, single-shorter-edge-lit LED TV (left-eye signal)
Figure 5:
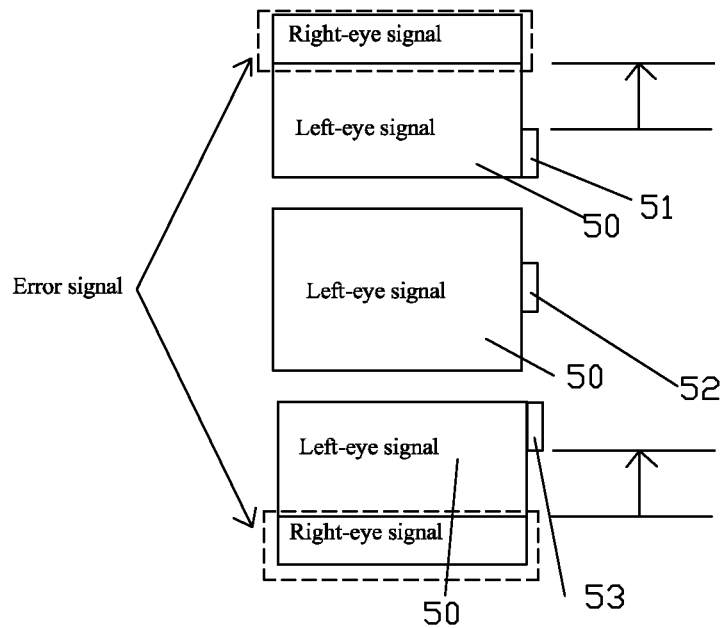
FIG. 5 is a schematic diagram showing the time-sequence relationship between signal to the backlight partitions of a backlight module according to a preferred embodiment of the present invention and signal to the LCD panel.

FIG. 5 is a schematic diagram showing the time-sequence relationship between signal to the backlight partitions of a backlight module according to a preferred embodiment of the present invention and signal to the LCD panel. As illustrated, the backlight module is separated into three consecutive backlight partitions: a first backlight partition 51, a second backlight partition 52, and a third backlight partition 53. The three backlight partitions can be individually lit or turned off by controlled time sequence for illuminating three corresponding display partitions of a LCD panel 50: a first display partition, a second display partition, and a third display partition, respectively.

According to the time sequence for controlling the signal to the LCD panel (including left- and right-eye signals) of an existing 3D LCD TV, the signal to the LCD panel is loaded to the LCD panel frame by frame and display partition by display partition. Then, according to the desired visual effect, the three backlight partitions are lit or turned off. When using a backlight module of the present embodiment to scan a corresponding LCD panel 50, the time-sequence relationship between signal to the backlight partitions and signal to the LCD panel 50 is as follows. Whenever the signal to the LCD panel loaded into the LCD panel 50 constitutes a complete frame, the second backlight partition 52 in the middle of the backlight module is always lit. Using the time sequence shown in FIG. 5 as example, in step A, the left-eye signal from a current frame is loaded into the first and second display partitions, and the right-eye signal from a previous frame is loaded into the third display partition. The first backlight partition 51 is lit to illuminate the first display partition. Since the leakage from the first backlight partition 51 may reach the third display partition, the right-eye signal from a previous frame loaded into the third display partition becomes the error signal causing cross-talk with the left-eye signal from a current frame loaded into the first display partition. At the moment, the first and third display partitions are separated by a display partition in between. In step B, the left-eye signal from a current frame is loaded into the third display partition, and the LCD panel 50 now is loaded with a complete left-eye signal. The second backlight partition 52 in the middle is lit to illuminate the second display partition. Since the leakage from the second backlight partition 52 does not cause any cross-talk between left- and right-eye signals, the image quality is best. In other words, the middle position can achieve the least cross-talk. In step C, the right-eye signal from a next frame is loaded into the first display partition, and the left-eye signal from a current frame is loaded into the second and third display partitions. The third backlight partition 53 is lit to illuminate the third display partition. Since the leakage from the third backlight partition 53 may reach the first display partition, the right-eye signal from a next frame loaded into the first display partition becomes the error signal causing cross-talk with the left-eye signal from a current frame loaded into the third display partition. At the moment, the first and third display partitions are separated by a display partition in between, which is the same as step A. In other words, the two steps have error signals at the same distance and therefore achieve comparable cross-talk. In the entire 3D display process, the LCD panel 50 is loaded repeatedly with the right-eye signal (previous frame), the left-eye signal (the current frame), the right-eye signal (the next frame), the left-eye signal, the right-eye signal, etc. The edge-lit backlight module of the present invention has an odd number of backlight partitions. In the present embodiment, the number is three. With the odd numbered backlight partitions, the present invention achieves vertically symmetric cross-talk with the middle position having the least cross-talk. The edge-lit backlight module can be a single-shorter-edge-lit one as shown in FIG. 5 or a dual-shorter-edge-lit one.

Figure 6:
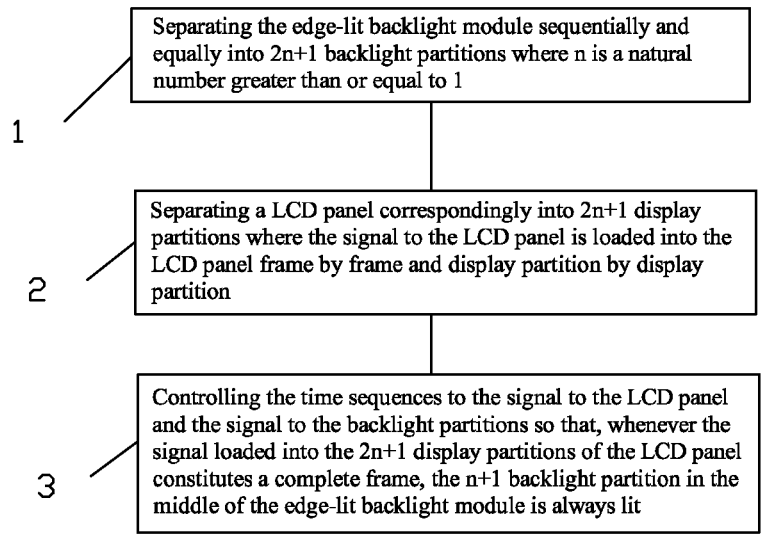
FIG. 6 is a flow diagram showing the steps of a scanning method according to the present invention.

FIG. 6 is a flow diagram showing the steps of a scanning method according to the present invention. The scanning method can be executed by a backlight module of the present invention, and contains the following steps.

In step 1, a backlight module is separated sequentially and equally into 2n+1 backlight partitions where n is a natural number greater than or equal to 1.

In step 2, a LCD panel is separated correspondingly into 2n+1 display partitions. The signal to the LCD panel is loaded into the LCD panel frame by frame and display partition by display partition.

In step 3, the time sequences to the signal to the LCD panel and the signal to the backlight partitions are controlled so that, whenever the signal loaded into the 2n+1 display partitions of the LCD panel constitutes a complete frame, the n+1 backlight partition in the middle of the edge-lit backlight module is always lit.

According to the present invention, the edge-lit backlight module can be a single-shorter-edge-lit one or a dual-shorter-edge-lit one, and n can be equal to 1.

In summary, the edge-lit backlight module and the scanning method of the present invention, by employing an odd number of backlight partitions, resolve the disadvantages of existing backlight modules with even-numbered backlight partitions. Additionally, since the limitation to the backlight duty cycle is the most important design factor affecting the cost of scanning backlight, the present invention is capable of effectively reducing the maximum cross-talk under the same backlight duty cycle.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. An edge-lit backlight module comprising 2n+1 sequentially and equally separated backlight partitions wherein n is a natural number greater than or equal to 1; the 2n+1 backlight partitions are lit or turned off individually and sequentially under a time-sequence control; a LCD panel scanned by the edge-lit backlight module is separated correspondingly into 2n+1 display partitions; the signal to the LCD panel is loaded into the LCD panel frame by frame and display partition by display partition sequentially under a time-sequence control; and the time sequences to the signal to the LCD panel and the signal to the backlight partitions are controlled so that, whenever a first backlight partition is lit, the first n+1 display partitions are loaded with a current frame for a first eye whereas the remaining n display partitions are loaded with a previous frame for a second eye; whenever the n+1 backlight partition in the middle of the edge-lit backlight module is lit, the 2n+1 display partitions are completely loaded with a current frame for the first eye; and, whenever a last backlight partition is lit, the first n display partitions are loaded with a next frame for the second eye whereas the remaining n+1 display partitions are loaded with the current frame for the first eye.

2. The edge-lit backlight module as claimed in claim 1, wherein the edge-lit backlight module is a single-shorter-edge-lit backlight module.

3. The edge-lit backlight module as claimed in claim 1, wherein the edge-lit backlight module is a dual-shorter-edge-lit backlight module.

4. The edge-lit backlight module as claimed in claim 1, wherein n is equal to 1.

5. An edge-lit backlight module comprising 2n+1 sequentially and equally separated backlight partitions wherein n is a natural number greater than or equal to 1; the 2n+1 backlight partitions are lit or turned off individually under a time-sequence control; a LCD panel scanned by the edge-lit backlight module is correspondingly separated into 2n+1 display partitions; the signal to the LCD panel is loaded into the LCD panel frame by frame and display partition by display partition under a time-sequence control; the time sequences to the signal to the LCD panel and the signal to the backlight partitions are controlled so that, whenever a first backlight partition is lit, the first n+1 display partitions are loaded with a current frame for a first eye whereas the remaining n display partitions are loaded with a previous frame for a second eye; whenever the n+1 backlight partition in the middle of the edge-lit backlight module is lit, the 2n+1 display partitions are completely loaded with a current frame for the first eye; and whenever a last backlight partition is lit, the first n display partitions are loaded with a next frame for the second eye whereas the remaining n+1 display partitions are loaded with the current frame for the first eye; the edge-lit backlight module is a single-shorter-edge-lit backlight module; and n is equal to 1.

6. A scanning method of an edge-lit backlight module comprising the steps of:
separating the edge-lit backlight module sequentially and equally into 2n+1 backlight partitions where n is a natural number greater than or equal to 1;
separating a LCD panel correspondingly into 2n+1 display partitions where the signal to the LCD panel is loaded into the LCD panel frame by frame and display partition by display partition under a time sequence; and
controlling the time sequences to the signal to the LCD panel and the signal to the backlight partitions so that, whenever a first backlight partition is lit, the first n+1 display partitions are loaded with a current frame for a first eye whereas the remaining n display partitions are loaded with a previous frame for a second eye; whenever the n+1 backlight partition in the middle of the edge-lit backlight module is lit, the 2n+1 display partitions are completely loaded with a current frame for the first eye; and whenever a last backlight partition is lit, the first n display partitions are loaded with a next frame for the second eye whereas the remaining n+1 display partitions are loaded with the current frame for the first eye.

7. The scanning method as claimed in claim 6, wherein the edge-lit backlight module is a single-shorter-edge-lit backlight module.

8. The scanning method as claimed in claim 6, wherein the edge-lit backlight module is a dual-shorter-edge-lit backlight module.

9. The scanning method as claimed in claim 6, wherein n is equal to 1.

* * * * *